United States Patent
Kozat

(10) Patent No.: US 9,426,517 B2
(45) Date of Patent: Aug. 23, 2016

(54) METHOD AND APPARATUS FOR LOW DELAY ACCESS TO KEY-VALUE BASED STORAGE SYSTEMS USING FEC TECHNIQUES

(71) Applicant: NTT DOCOMO, INC., Palo Alto, CA (US)

(72) Inventor: Ulas C. Kozat, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 26 days.

(21) Appl. No.: 14/405,290

(22) PCT Filed: Mar. 13, 2013

(86) PCT No.: PCT/US2013/030891
§ 371 (c)(1),
(2) Date: Dec. 3, 2014

(87) PCT Pub. No.: WO2013/184201
PCT Pub. Date: Dec. 12, 2013

(65) Prior Publication Data
US 2015/0149870 A1 May 28, 2015

Related U.S. Application Data

(60) Provisional application No. 61/657,554, filed on Jun. 8, 2012.

(51) Int. Cl.
*H04N 21/433* (2011.01)
*H04N 21/4408* (2011.01)
(Continued)

(52) U.S. Cl.
CPC ........ *H04N 21/4334* (2013.01); *G06F 11/1076* (2013.01); *G06F 11/1096* (2013.01); *H04L 1/004* (2013.01); *H04L 1/0048* (2013.01); *H04N 21/4408* (2013.01)

(58) Field of Classification Search
CPC . H04N 21/4334; H04N 21/4408; H04L 1/004
See application file for complete search history.

(56) References Cited

U.S. PATENT DOCUMENTS

2005/0193309 A1 9/2005 Grilli et al.
2008/0317436 A1* 12/2008 Sasamoto ........ G11B 20/00086
386/259

(Continued)

OTHER PUBLICATIONS

PCT/US2013/030891 Notification Concerning Transmittal of International Preliminary Report on Patentability, mailed Dec. 18, 2014, 6 pages.

(Continued)

*Primary Examiner* — Joseph D Torres
(74) *Attorney, Agent, or Firm* — Blakely, Sokoloff, Taylor & Zafman LLP

(57) ABSTRACT

A method and apparatus is disclosed herein for low delay access to key-value based storage systems. In one embodiment, the method for putting data into a key-value store comprises selecting an erasure coding to apply to K portions of data as a function of delay performance of the key-value based storage system including determining a number of parity blocks to satisfy one or both of a delay target of putting the object into the key-value store and a delay target of subsequent read requests based on an offline performance simulation of delay performance; applying the erasure coding to the K portions to create N blocks of data; and sending the N write requests to write blocks of data to the storage system, where each block is assigned a unique key in the key-value store.

24 Claims, 12 Drawing Sheets

(51) Int. Cl.
    *H04L 1/00*           (2006.01)
    *G06F 11/10*         (2006.01)

(56) References Cited

U.S. PATENT DOCUMENTS

| | | |
|---|---|---|
| 2009/0164762 A1 | 6/2009 | Huang et al. |
| 2010/0070777 A1* | 3/2010 | Salters .................... G11C 7/24 713/189 |
| 2010/0218037 A1 | 8/2010 | Swartz et al. |
| 2011/0173162 A1 | 7/2011 | Anderson et al. |
| 2011/0208996 A1 | 8/2011 | Hafner et al. |
| 2012/0030511 A1 | 2/2012 | Wylie et al. |

OTHER PUBLICATIONS

PCT International Search Report mailed 31 May 2013 for PCT Application No. PCT/US20131030891, filed 13 Mar. 2013, 3 pp.

Written Opinion of the International Searching Authority mailed May 31, 2013 for PCT Application No. PCT/ US20131030891, filed 13 Mar. 2013, 4 pp.

Cohen, et al., "Ordering Disks for Double Erasure Codes", Spaa '01 Proceedings of the thirteenth annual Acm symposium on Parallel algorithms and architectures, 2001, pp. 1-10.

Li, et al., "Beacon-driven Leader Based Protocol over a Ge Channel for Mac Layer Multicast Error Control", I.J. Communications, Network and System Sciences, 2008, 9 pp.

* cited by examiner

600 ↘

| Object Size (Kbyte) | Operation Type | Request Time | RTT Delay (msec) | Cloud Location |
|---|---|---|---|---|
| 1 | write | $t_0$ | 101 | Cloud-1 |
| 1024 | write | $t_1$ | 410 | Cloud-1 |
| 4096 | read | $t_2$ | 300 | Cloud-2 |
| 1024 | write | $t_3$ | 152 | Cloud-2 |
| ... | ... | | ... | ... |
| ... | ... | | ... | ... |

| Cloud Location | Operation Type | Size Range [Kbyte , Kbyte] | RTT Delay Percentile | RTT Delay (msec) |
|---|---|---|---|---|
| ... | ... | ... | ... | ... |
| Cloud-1 | write | [900 , 1100] | 90 | 200 |
| Cloud-1 | write | [900 , 1100] | 99 | 400 |
| Cloud-1 | write | [900 , 1100] | 99.9 | 700 |
| Cloud-1 | write | [900 , 1100] | 99.99 | 4000 |
| ... | ... | ... | ... | ... |

FIG. 9

| Cloud Location | Operation Type | Object Size (Kbyte) | FEC-Type (N,K) | RTT Delay Percentile | RTT Delay (msec) |
|---|---|---|---|---|---|
| ... | ... | ... | ... | ... | ... |
| Cloud-1 | write | 1024 | (2,1) | 90 | 190 |
| Cloud-1 | write | 1024 | (2,1) | 99 | 300 |
| Cloud-1 | write | 1024 | (2,1) | 99.9 | 350 |
| Cloud-1 | write | 1024 | (2,1) | 99.99 | 400 |
| Cloud-1 | write | 1024 | (16,8) | 90 | 160 |
| ... | ... | ... | ... | ... | ... |

METHOD AND APPARATUS FOR LOW DELAY ACCESS TO KEY-VALUE BASED STORAGE SYSTEMS USING FEC TECHNIQUES

PRIORITY

The present patent application is a U.S. National Phase Application under 35 U.S.C. §371 of International Application No. PCT/US2013/030891, filed Mar. 13, 2013, entitled A METHOD AND APPARATUS FOR LOW DELAY ACCESS TO KEY-VALUE BASED STORAGE SYSTEMS USING FEC TECHNIQUES, which claims priority to and incorporates by reference the corresponding provisional patent application Ser. No. 61/657,554, titled, "A Method and Apparatus for Low Delay Access to Key-Value Based Cloud Storage Systems Using FEC Techniques," filed on Jun. 8, 2012.

FIELD OF THE INVENTION

Embodiments of the present invention relate to the field of storage systems; more particularly, embodiments of the present invention relate to the use of forward error correction (FEC) in the storage and retrieval of objects in storage systems.

BACKGROUND

In public clouds such as Amazon's S3, the delay for a single read or write operation for small objects (e.g., less than or equal to 1 Kbyte) can be hundreds of milliseconds of delay, while for medium size objects (e.g., >1 Mbyte) delays become in the order of seconds at the 99th and 99.9th percentiles. For cascaded operations where one transaction needs many reads and writes to the same storage facility, these delays can be unacceptably high. For video content that consists of many megabytes, how to use S3 type storage as the video archive, while attaining small startup delays and no pauses for video playback also becomes a critical issue.

In storage systems such as RAID, distributed storage solutions based on DHTs, content distribution networks, the system designer has the control over how to stripe the data, where to place each data part, replication (coded/uncoded) locations, etc. A representative block diagram for these existing systems is shown in FIG. 1. Referring to FIG. 1, a storage controller with full knowledge of storage elements performs parallel reads and writes to storage devices/systems to increase throughput. This storage controller also employs FEC encoding for reliability and FEC decoding for recovering data if some storage elements fail. The storage controller can have both software and hardware based parts for optimized integrated solution.

For video communication, applying forward error correction and using parallel weakly correlated paths to send subsequent streaming packets between a source-destination pair are well-known techniques. A representative illustration for this is shown in FIG. 2, where a source node uses three disjoint paths to send packets to its destination node. The source packets are expanded with parity packets for extended protection against packet losses. As late packets in this context are equivalent to packet losses, one can treat the scenario as delay-sensitive application of FEC and path diversity. In these set ups, however, disjoint paths are visible to the source as different interfaces or as a whole topology.

SUMMARY OF THE INVENTION

A method and apparatus is disclosed herein for low delay access to key-value based storage systems. In one embodiment, the method for putting data into a key-value store comprising dividing the data into K portions, where K is an integer; selecting an erasure coding to apply to the K portions as a function of delay performance of the key-value based storage system including determining a number of parity blocks to generate to satisfy one or both of a delay target of putting the object into the key-value store and a delay target of subsequent read requests based on an offline performance simulation of delay performance when different numbers of parity blocks are used given the delay distributions obtained through measurements for different request types and object sizes; applying the erasure coding to the K portions to create N blocks of data; sending the N write requests to write blocks of data to the storage system, where each block is assigned a unique key in the key-value store. In one embodiment, the N block of data can be sent using a combination of parallel and serial transfers. In one embodiment, the method further comprises cancelling up to N−K requests once K of the N write requests have been successfully completed, if no delay targets for subsequent read operations exist.

In another embodiment, a method for subsequently getting the data from the key-value store comprises requesting N portions using their corresponding unique keys using N requests and applying erasure decoding as separate portions of the data are retrieved. In one embodiment, the method further comprises, where any K parts are sufficient to recover an original object, after receiving K parts from K of the N requests being completed successfully, then aborting up to N−K requests that remain uncompleted.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 8 illustrates raw data in terms of delay performance for different cloud locations that are stored in a database.

FIG. 9 illustrates delay performance determined from processing data, where the delay performance is stored in a table form as a mapping from 4-tuple (location, operation type, object size range, RTT delay percentile) to RTT delay value.

DETAILED DESCRIPTION OF THE PRESENT INVENTION

Figure 1:
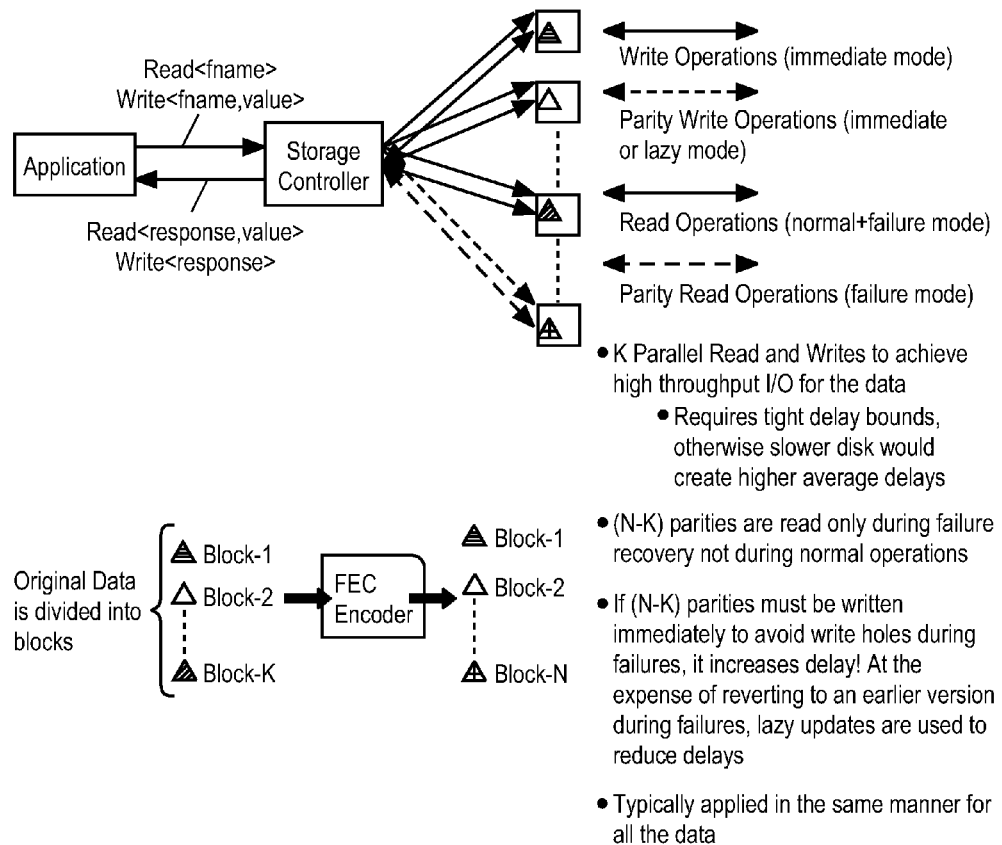
FIG. 1 illustrates a prior art storage system that uses forward error correction (FEC).
Figure 2:
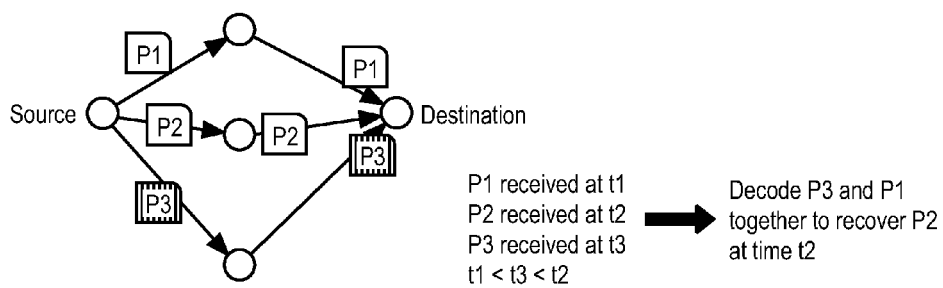
FIG. 2 illustrates an example of jointly using FEC and multi-path routing to reduce the decoding delay in communication networks.

Embodiments of the invention include methods and apparatus to provide a more robust delay performance in storing and retrieving data objects such as, for example, but not limited to, videos, images, documents, meta-data, etc. in cloud-based storage systems. These could include public clouds such as Amazon S3. One or more techniques described herein can be used by the host devices where data is produced and/or consumed as well as by proxy nodes that sits between the host devices and the storage facility.

A public storage facility is accessed through using their API that opens connections between the API client (host or proxy nodes) and API server (residing in the storage facility). Through the API, clients can issue put, get, delete, copy, list, etc. requests where appropriate providing security credentials, local keys and global names to uniquely identify the objects, byte strings that represent the object, etc. Thus, there is no control over these aspects of the cloud-storage systems. Embodiments of the invention does not own or control the internals of the backend storage system, and the storage system is treated as a "black box" that provides its storage services through well-defined APIs. Once a data object is written/read/copied through the API, the storage client has no visibility how the data was striped and protected, how the operations are parallelized and load-balanced, etc. Although clients are agnostic to how their requests are operationally carried out within the cloud-based storage systems, they are sensitive to end to end delays incurred in resolving their requests.

Embodiments of the invention make use of the fixed rate erasure coding techniques to eliminate the tail performers in key-value based storage systems. The clients or other storage access system/device (e.g., a gateway coupled to a network to one or more storage systems) divide a larger object into smaller objects or groups commonly used small objects together to create an ordered set of objects. In one embodiment, each object in the set has to be smaller than a preconfigured size (e.g., in bytes). The objects starting from the smallest index value to largest are given as input blocks to a fixed rate erasure encoder after padding each block to the preconfigured size. For example, if an ordered set has cardinality K and the erasure code rate is K/N, then the encoder generates (N−K) output parity blocks of the same fixed size. The client stores the original K source blocks and (N−K) parity block separately using N ordered unique keys in the public storage facility. When the client (or storage access system/device) needs to put/write or get/read the large object or group of objects, it sends N parallel put/write or get/read requests using unique keys to all the source blocks and the parity blocks associated with the large object or group of objects. When the client (or storage access system/device) receives K valid responses to any subset of these N requests, it considers the operation as completed. If the request was a put/read request, it reconstructs the original K smaller objects through erasure decoding. In reconstruction, the order of keys is used to determine the order of smaller objects and parity blocks in the code word generated by the erasure encoder. In such a case, the use of erasure coding in the system is not to increase storage reliability nor handle packet losses, but to improve the delay performance at low storage and communication overhead.

When the earliest K responses get delayed over a dynamically or statically determined delay threshold, the client (or storage access system/device) issues a minimal number of new put/write or get/read requests for a subset of N keys that are sufficient to recover all the objects in the originally requested set.

Embodiments of the invention provide robust delay performance for both read and write requests for objects stored in public cloud storage systems when such systems exhibit large delay jitters. The delay vs. overhead performance can be traded off per content basis using different FEC rates (including no coding). The system can be designed such that one can target write-only, read-only, or both read and write performance. The parity blocks can be deleted at will without impacting reliability or availability as these guarantees are provided orthogonally by the storage service. Such embodiments with more robust delay performance can be used to selectively guarantee low delay for more important content.

The FEC used in embodiments of the present invention and the FEC (if any) applied by the backend storage system are complementary to each other and are not coupled together. Embodiments of the invention do not read/write parity blocks to storage to achieve high reliability and availability as these targets are already satisfied by the backend storage system. As such, losing parity blocks generated by techniques described herein do not require regeneration nor are critical for availability. In fact, to save storage space or to reduce storage costs, the parity blocks can be deleted at will. Furthermore, in backend storage systems when FEC is used to increase reliability, read operations do not require reading parity blocks during regular no-failure scenarios to avoid unnecessary loading of the system. The write operations with FEC can also induce higher delays in such systems as the system must make sure that all the parity blocks are written to guarantee recoverability when failure occurs. In contrast, embodiments of the invention only care about first k blocks to be written successfully, which is the key to reduce delays.

One feature of embodiments of the invention is that it treats the backend storage as a "point-to-point channel" (between the storage client and storage system) with non-deterministic delay performance. Embodiments of the invention constructs the delay distribution of the system for various ranges of object sizes and reconstructs the delay distribution using various FEC strategies (i.e., for different tuples of (n,k)) and parallelization together. When the client (or storage access system/device) targets a particular delay performance at a given percentile, it picks the parallelization and FEC strategy to deliver the performance.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Figure 3:
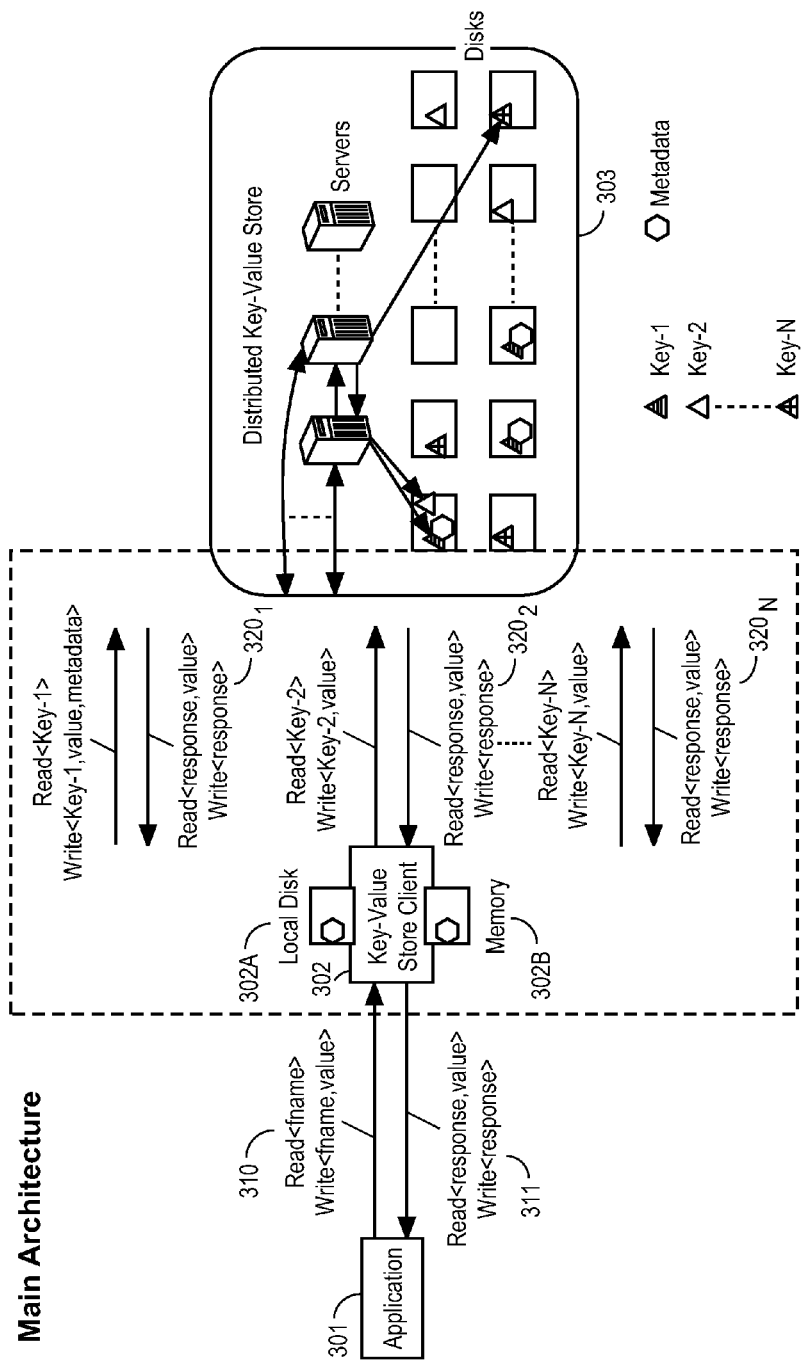
FIG. 3 is a block diagram of one embodiment of a storage system according to the present invention.

FIG. 3 is a block diagram of one embodiment of a storage system. Referring to FIG. 3, in one embodiment, there are three main components to the architecture: an application 301, a key-value store client 302, and a distributed key-value store 303.

Application 301 is the consumer of the storage system. Application 301 generates data to be stored in the backend storage (e.g., distributed key-value store 303) and downloads the data stored in the backend storage.

Key-value store client 302 interfaces application 301 with the backend storage, namely distributed key-value store 303.

In one embodiment, key-value store client 302 provides an API to application 301 to receive and respond back to the requests of application 301. These requests include read and write requests (310) and responses (311). In one embodiment, the read request specifies a filename (fname), and the write request specifies a filename (fname) and the data object (value) being stored. In one embodiment, the read response specifies a read response and the data object (value) that was requested, and the write response specifies a response indicating that the data object has or has not been successfully stored in the backend storage.

In one embodiment, key-value store client 302 uses APIs provided by the backend storage to issue subsequent requests to the backend storage in order to resolve requests from application 301 before responding back to application 301. In one embodiment, the read requests to key-value store 303 take the form Read<Key-1> and the write requests to key-value store 303 take the form Write<Key-1, value, metadata>, where Key-1 specifies the location in key-value store 303, "value" specifies the data object being written and "metadata" specifies metadata associated with the data object being stored. In one embodiment, the read responses from key-value store 303 take the form Read<response, value> and the write responses from key-value store 303 take the form Write<response>, where "response" specifies whether the operation was successfully performed, and "value" specifies the data object being read from key-value store 303. In the case of a "value" being returned from or sent to key-value storage from the key-value store client, this value corresponds to either an uncoded portion or the encoded portion of a data object. Each part (source or parity) is treated as an object (i.e., byte-string) of a given size, and the "value" is then a source block or a parity block depending on the key used to access the data.

Note that in one embodiment, the first K keys correspond to the uncoded sequence of K blocks of a data object and (K+1)th to Nth keys correspond to parity blocks associated with a data object. Also note in one embodiment, the metadata is only read if it is not stored locally in memory or disk at key-value store client 302. As will be described in greater detail below, key-value store client 302 returns a response to application 301 after only receiving K successful read/write replies.

In one embodiment, key-value store client 302 has its own local disk 302A and in-memory cache 302B to store data of application 301 and to resolve requests of application 301. In one embodiment, key-value store client 302 also models the cumulative distribution function of delays for different packet ranges with and without applying FEC. In one embodiment, key-value store client 302 is also responsible for parallelization of read/write requests with the distributed storage backend.

Distributed key-value store 303 is the distributed storage backend that provides APIs and/or libraries to the store client for operations such as writing, reading, deleting, copying objects (e.g., a sequence of opaque bytes). Typical examples of such storage backends include, but are not limited to, Amazon S3, Cassandra, DynamoDB, etc. In one embodiment, key-value store 303 provides persistent, highly available and durable storage. To accomplish this, key-value store 303 uses replication where multiple copies of the same object are stored in and accessed from different physical locations. In one embodiment, for increased durability with more storage efficiency, key-value store 303 uses FEC protection within (i.e., in conjunction with data striping) or across the data objects. Such features are transparent to application 301 as well as to key-value store client 302.

In one embodiment, the processes performed by application 301 and key-value store client 302 run on the same physical machine. In another embodiment, they can be run on different physical machines and communicate directly or over a network.

Figure 4:
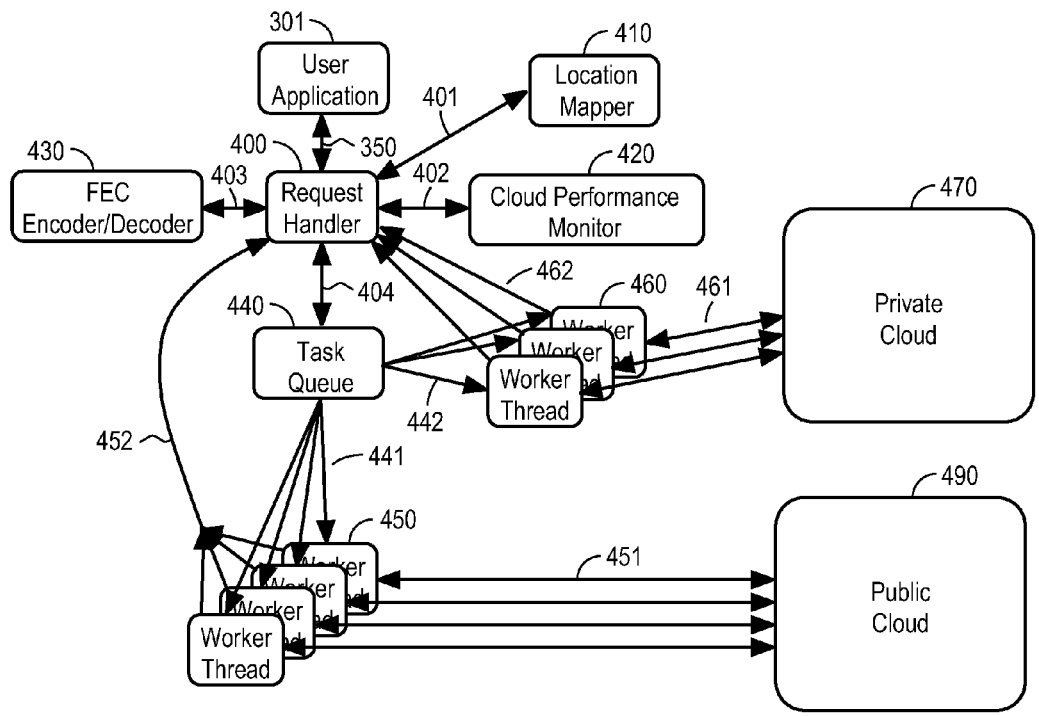
FIG. 4 illustrates function blocks of one embodiment of a storage controller application.

FIG. 4 is a block diagram illustrating blocks of an application executed by key-value store client, such as key-value store client 302 of FIG. 3, including the relationships between the different blocks in order to store and retrieve objects from a distributed key-value store, such as distributed key-value store 303 of FIG. 3. In one embodiment, when directly using the API provided by the key-value store, user application 301 can see a performance variation in end-to-end delays when putting or getting its objects. In one embodiment, the API used by user application 301 is similar or an exact clone of the API provided by the key-value store. This API corresponds to the interface numbered 350 in FIG. 4. In one embodiment, the API itself supports optional parameters that specify the delay targets for the requested operation. In another embodiment, a configuration option is provided for user application 301 through a management interface to set the delay targets globally. In one embodiment, both options are available.

Figures 10, 11:
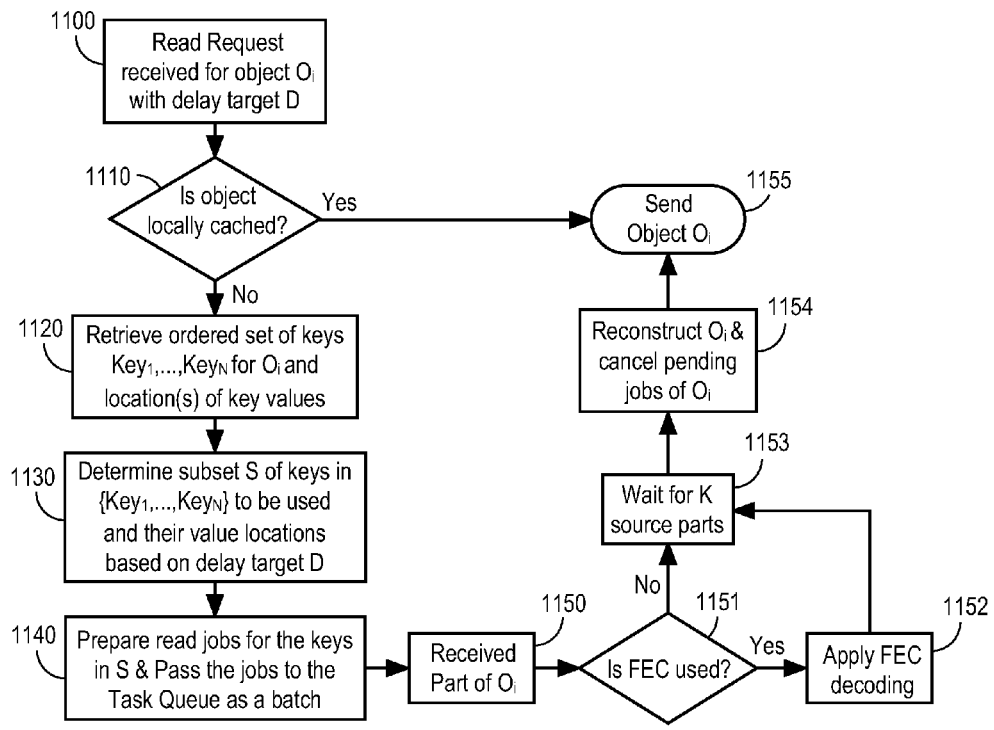
FIG. 10 illustrates performance tables created off-line from processing raw data, where the performance tables are for hypothetical FEC scenarios for various object sizes.
FIG. 11 is a flow diagram of one embodiment of a process for read request handling performed by a request handler.
Figure 12:
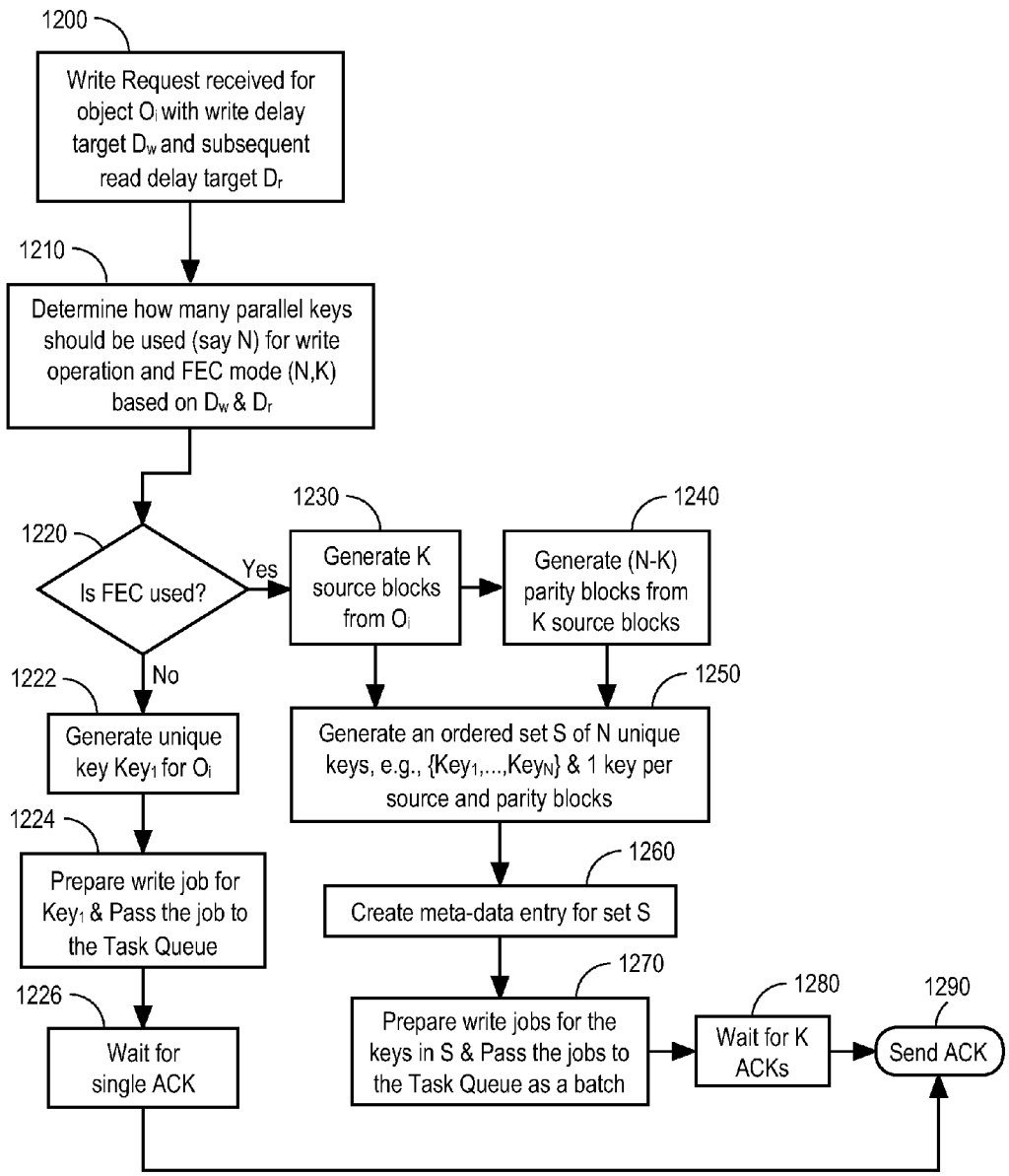
FIG. 12 is a flow diagram of one embodiment of a process for write request handling performed by a request handler.

The core operations performed by the key-value client application of FIG. 4 are the read and write operations. FIG. 11 is a flow diagram depicting one embodiment of a process for performing a read operation and FIG. 12 is a flow diagram depicting one embodiment of a process for performing a write operation. These will be discussed in more detail below.

Figure 6:
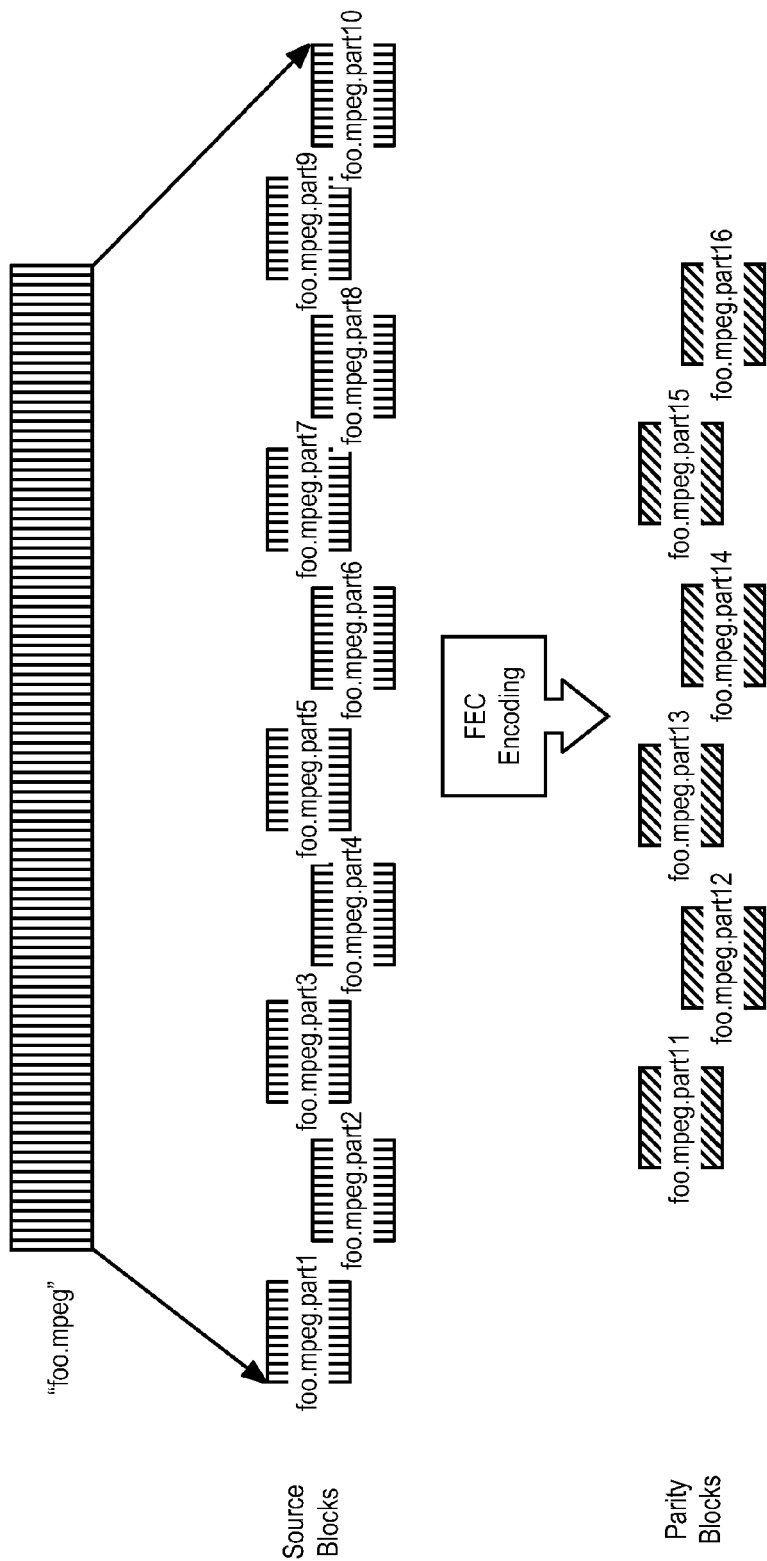
FIG. 6 illustrates an example of objects with unique names being divided into subblocks that each have a unique key.

Referring to FIG. 4, after receiving a read request through interface 350, under one set of conditions (e.g., under normal conditions where no errors have been reported by the underlying cloud API), the following operations occur:

1. Request handler 400 extracts a unique ID and delay target D of a requested object ($O_i$) from an incoming message itself. In FIG. 11, this first operation corresponds to processing block 1100.
2. To determine where in the storage hierarchy the requested object is stored, request handler 400 issues a mapping service using interface 401 to location mapper 410 with the unique ID of the requested object. If object is locally stored (e.g., an in-memory cache or local disk of key-value store client), then request handler 400 retrieves the data from local storage (not shown in FIG. 4) and sends the object to the user application. These method steps correspond to processing blocks 1110 and 1155 in FIG. 11.
3. If the requested object is not stored locally, location mapper 410 returns an ordered set of keys ($Key_1, \ldots, Key_N$) corresponding to the object ($O_i$) and which data store to be used per key (block 1120 in FIG. 11). This ordered set of keys points to the source blocks and parity blocks for the requested object. For instance, if the user application wants to read a video file "foo.mpeg" (see FIG. 6), the user application provided object name can be prefixed by a unique application ID to generate a unique ID for the disclosed client (e.g., client 302). In the example depicted in FIG. 6, "foo.mpeg" is divided into 10 equal parts (i.e., K=10) as a result of the last write operation, and these 10 equal parts are referred to as source blocks or subblocks interchangeably. They are enumerated with respect to their byte order in the original content and assigned unique keys, e.g., <UID, foo.mpeg.part1>, ..., <UID, foo.mpeg.part10>. For purposes herein, the notation <*,*> is used to concatenate the two substrings*separated by comma. These subblocks are further input into FEC encoder 430, such as a Reed Solomon coder to generate parity blocks, each of which are assigned unique keys in on order preserving fashion. For key assignment, <UID,foo.mpeg.partK+1> to <UID,foo.mpeg.parkN> are assigned to parity blocks 1 to (N−K), respectively. The last time this object was updated, it was written with six additional parity blocks (i.e., N−K=6 or N=16 for K=10). Thus, there would be unique key labels <UID, foo.mpeg.part11>, ..., <UID, foo.mpeg.part16> following the order they were output by the FEC encoder 430. The mapping from "foo.mpeg" for the specific application to these unique keys as well as the information about how many of these keys correspond to the original object stripes are stored persistently as metadata and cached near to request handler 400. When request handler 400 issues a mapping service for object <UID, foo.mpeg>, location mapper 410 can respond with this list of unique key labels and backend storage ID per label. In FIG. 4, two backend storage locations are identified as private cloud 470 and public cloud 490. A source or parity block corresponding to a key can be stored in multiple storage locations, e.g., <UID, foo.mpeg.part16> and can have its value available both in 470 and 490. In that case, both locations are returned by location mapper 410 with no preference among them.
4. Request handler 400 passes the delay target D (specified in the application request from user application 301 in one embodiment), a number of source blocks and source block size information (retrieved from the metadata persistently stored for each object) to cloud performance monitor 420, which returns the information of how many parallel linearly independent requests should be issued as well as a preference order of storage clouds. Note that in one embodiment, to determine the number of parallel independent requests are needed, whenever a read or write operation is done, its delay from the time the request is put on the wire until a complete response is received is recorded. The CPM constructs delay distributions for different object sizes using this information. Then it computes offline delay distributions if different FEC was employed using the delay distribution of objects close to the block size used by the FEC. These operations assist in making the decisions of block 1130 in FIG. 11. In one embodiment, the number of parallel requests is larger than or equal to K and less than or equal to N. Thus, any subset S of keys in $\{Key1, \ldots, Key_N\}$ can be picked by request handler 400. In one embodiment, in cases where private cloud 270 has a copy and it is not congested, private cloud 270 is listed higher in preference than public cloud 490. In cases where private cloud 470 sees excessive loads and delays in comparison to public cloud 490, public cloud 490 might have a higher preference.
5. Request handler 400 prepares parallel read jobs (block 1140 in FIG. 11), where each job is for one unique key corresponding to a source or parity block, using the output of cloud performance monitor 420. In one embodiment, each job is self-descriptive in the sense that which cloud location should be used for the job is included in its job description. All the parallel read jobs corresponding to the same object are passed as a batch to task queue 440. In one embodiment, the jobs in a batch are not interleaved with the jobs that belong to other batches.
6. Interface 404 serves two purposes: (i) passing the actual jobs and (ii) passing job or batch attributes. Request handler 400 can cancel an individual job or all the jobs of a given batch by changing the job or batch attribute to "cancelled". If the job is still in its queue, task queue 440 deletes the job. Otherwise, task queue 440 issues an abort command to the thread processing the job.

7. Worker Threads (threads 450 & 460) serve one job at a time and when their current job finishes (handed to request handler 400 to execute block 1150), the worker threads ask for a new job from task queue 440. Task queue 440 hands the head of line job to the requesting worker thread. Worker threads can access to different cloud locations using the job description. The APIs to access these different clouds can be different, and thus the location information dictates which cloud instance should be used and which API call has to be issued. If an abort command is received for an ongoing job, then the worker thread can cancel its current job, return job status to request handler 400, and asks for a new job.

8. If FEC is used, request handler 400 passes the source blocks and parity blocks of a given batch to FEC decoder 430 as they are returned by a number of worker threads. If the returned block is a source block, it is also kept by request handler 400. FEC decoder 430 as it is able to recover any missing source blocks (not yet received) passes the recovered source blocks to request handler 400 (processing blocks 1151 & 1152 in FIG. 11).

9. In one embodiment, once it receives all the source blocks of the requested object (processing blocks 1153 & 1154 of FIG. 11), request handler 400 sends the object $O_i$ back to the user application (processing block 1155 of FIG. 11). In another embodiment, request handler 400 opens a stream channel where the user application can read source blocks in-order. In such a case, the user application can start receiving a byte stream before the full object is recovered by request handler 400.

10. Once all the source blocks are recovered for a given batch, request handler 400 issues a cancellation request to task queue 440 for the remaining jobs of the same batch (processing block 1154 of FIG. 11).

In one embodiment when the object is read, request handler 400 issues a write request as a background job to private cloud 470 for the blocks not yet stored in private cloud 470. This prevents the necessity to connect to public cloud 490 for the same object in the future. The caching can be done in multiple hierarchies and a cache eviction policy for in memory or in local disk storage can trigger a write operation to private cloud 470.

After receiving a write request through interface 350, under one set of conditions (i.e., under normal conditions where no errors have been reported by the underlying cloud API), the following operations occur:

11. Request handler 400 extracts the unique ID, receives the entire object and delay target of the current write operation ($D_w$) and/or the delay target of the subsequent read operations ($D_r$) on the same object $O_i$ (processing block 1200 in FIG. 12). In one embodiment, the object is locally cached/stored.

12. Request handler 400 passes the object size as well as the write and read delay targets using interface 402 to cloud performance monitor 420. Cloud performance monitor 420 returns the information about how many source (i.e., K) and parity blocks (i.e., N-K) should be sent in parallel to achieve the delay target (processing block 1210 in FIG. 12).

13. If FEC is to be utilized, request handler 400 divides the object into K source blocks using the output by cloud performance monitor 420 and asks FEC encoder 430 to generate N-K parity blocks matching the required number according to cloud performance monitor 420 (processing blocks 1220, 1230 & 1240 of FIG. 12). If FEC is not used, then a single unique key assignment (e.g., $Key_1$), issuing a single write job, and sending back the success result when the write job is completed successfully are the default set of operations performed (processing blocks 1222, 1224, 1226, 1290 of FIG. 12).

14. Request handler 400 generates an ordered set S of unique keys ($Key_1, \ldots, Key_N$) to label each source block and parity block to be written as part of the same write operation. In one embodiment, this metadata is persistently stored locally as well as tagged to the write jobs (i.e., public cloud 490 will store the metadata as well). Using the example in FIG. 6, an original object is divided into 10 source blocks and FEC encoder 430 generates 6 parity blocks. Thus, request handler 400 creates and ordered set of 16 unique keys to individually and uniquely identify source blocks and parity blocks of a given object. These operations are carried out as part of processing blocks 1250 & 1260 of FIG. 12.

15. Request handler 400 caches the excessive parity blocks and creates a new batch of jobs where each job is a write request for a unique key in the newly generated ordered set. This batch of jobs is passed to task queue 440. These operations correspond to processing block 1270 of FIG. 12. In one embodiment, the jobs in a batch are not interleaved with the jobs that belong to other batches. In another embodiment, the jobs are interleaved if they are demoted to "background job" status.

16. In one embodiment, request handler 400 can demote an individual job or all the jobs of a given batch by changing the job or batch attribute to "background job". Then, request handler 400 can move higher priority jobs in front of these background jobs. Jobs of different batches that are demoted to background traffic are processed on a first come first serve basis. The change of attribute is done through the interface 404.

17. In one embodiment, worker threads 450 and 460 serve one job at a time and when their current job finishes, they ask for a new job from task queue 440. Task queue 440 hands the head of line job to the requesting worker thread. Worker threads 450 and 460 can access to different cloud locations using the job description. The APIs to access these different clouds can be different, and thus the location information dictates which cloud instance should be used and which API call has to be issued.

18. Request handler 400 listens to the number of successful write responses (i.e., ACKs or Acknowledgements) from worker threads 450 and 460 for a given batch. After receiving sufficient number of successful write responses (i.e., ACKs), request handler 400 sends a success response (i.e., ACK) back to the application that originally issued the write request. These operations correspond to processing blocks 1280 and 1290 of FIG. 12. In one embodiment, request handler 400 demotes the remaining jobs in the same batch to background status by changing the job attributes through interface 404.

Figure 5:
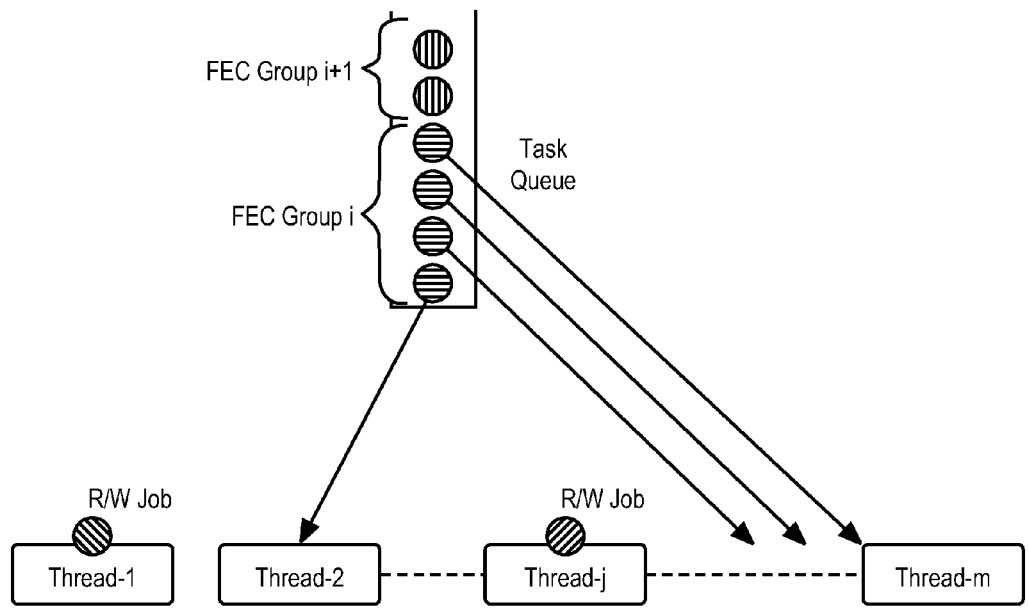
FIG. 5 illustrates parallel threads that execute read/write jobs and obtain new jobs from a task queue when they are done servicing their current job.

In one embodiment, task queue 400 is implemented using a first input first output (FIFO) queue, where the read or write jobs that belong to the same FEC block or group are put in one batch with no interleaving with jobs that belong to the other FEC blocks. In one embodiment, individual worker threads serve one job at a time and when any thread becomes idle, it gets the job waiting at the head of the task queue. FIG. 5 illustrates parallel threads, namely, thread-1 to thread-m, that execute read/write jobs and obtain new jobs from task queue 440 when they are done servicing the current job. In one embodiment, threads themselves do not have queues as all buffering is done by task queue 440. When there is congestion, i.e., there are more jobs waiting in the task queue than the idle threads, the delay performance worsens. For that reason, in another embodiment, requests with lower delay requirement (e.g., which use lower rate FEC codes) are given strict priority and placed at the head of task queue 440. In another embodiment, some threads can be pooled together to serve only the high priority jobs or can be used in preemptive mode (i.e., low priority job is stopped or cancelled to serve the high priority job).

In one embodiment, cloud performance monitor (CPM) 420 is used in the decision making process. Worker threads, such as worker threads 250 and 260, create a log for successfully completed jobs with information on object size, request type (read or write), sending time, cloud location, and round trip time delay (i.e., from the time the job is scheduled until the time a successful response is received). FIG. 8 shows how CPM 420 logs this information in a table that is stored in a database. Referring to FIG. 8, the information including object size, operation type, round trip time (RTT) delay and cloud location are stored in a table. CPM 420 processes these logs to create cumulative distribution functions (CDF) or complementary CDF (CCDF) for delay performance of different job types and object sizes. In one embodiment, to perform this, the CDF tabulates for delay target x, what was the fraction of requests served below x. Similarly, CCDF tabulates for delay target x, what was the fraction of requests served with more than x seconds. One can specify any tuple {x, object size, operation} and compute the answer from the raw data set. Since this may take substantial time, there are other ways to prepare a look up table for a finite set of tuples. Examples are given as look up tables in FIGS. 9 and 10.

Figure 7:
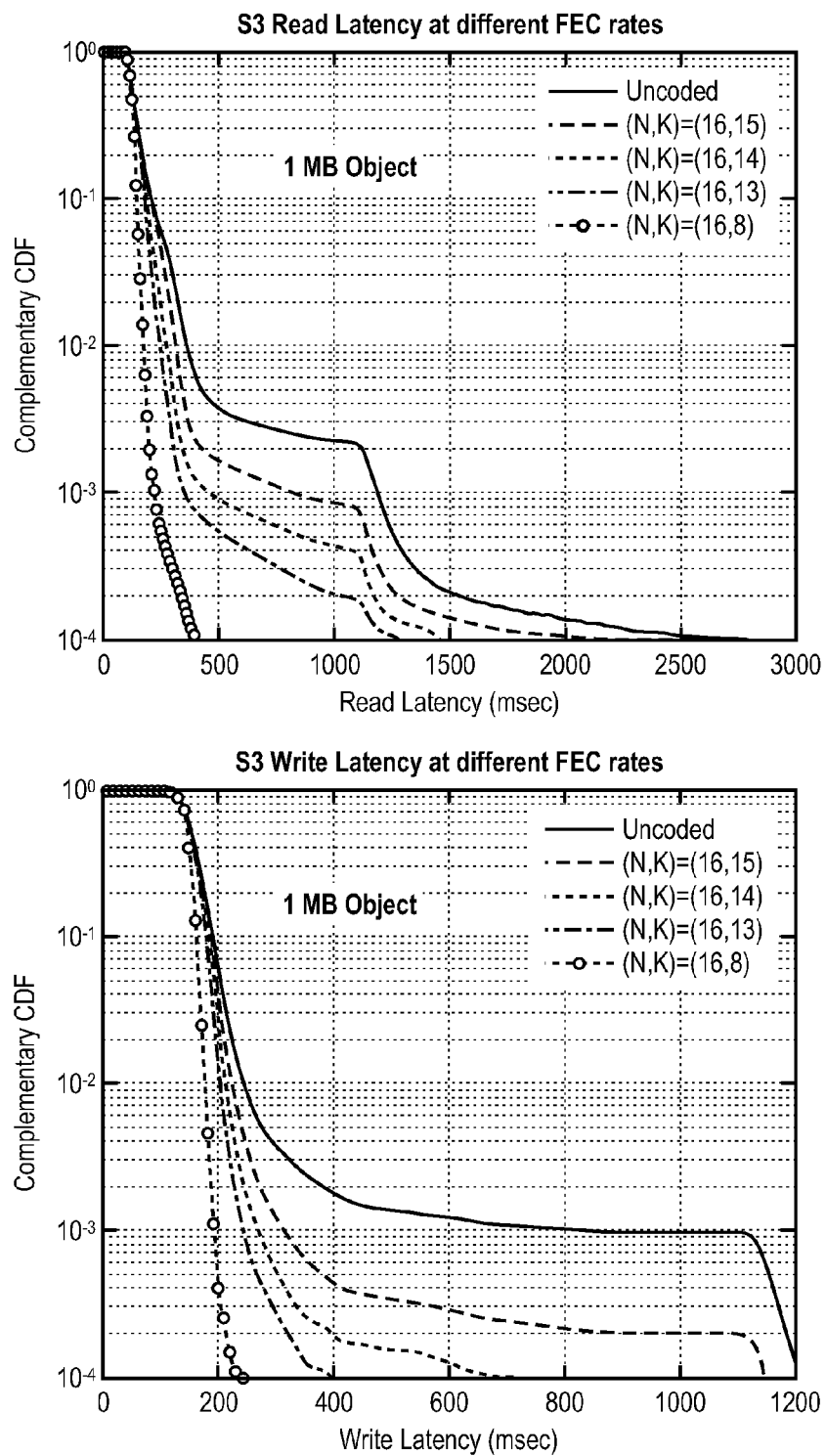
FIG. 7 illustrates the use of Complementary Cumulative Distribution Function (CCDF) Curves.

FIG. 7 shows an example of such CCDF curves obtained for Amazon S3 cloud service for 1 Mbyte block sizes for read and write jobs. Referring to FIG. 7, the solid curve is obtained using raw delay figures, while dashed lines are obtained through an offline analysis/simulation of the performance after various FEC schemes are employed. In the legends, n indicates the total number of blocks (i.e., source blocks plus parity blocks) whereas k indicates the number of parity blocks. Therefore, (n,k)=(16,1) means that there were 15 source blocks and 1 parity block. Since the block size is 1 Mbyte, for an object of 15 Mbyte striped into 15 blocks of 1 Mbyte from which 1 parity block was generated, the read or write delay performance would be the curves just to the left of the uncoded delay performance of 1 Mbyte objects. In one embodiment, CPM 420 creates bins of object sizes and aggregates all the delay measurements corresponding to a bin into CDF or CCDF curves. These performance curves are typically stored in a tabular form such as depicted in FIG. 9. Using a preset list of block sizes and for various (n,k) settings, a library of CDF or CCDF curves are constructed. When for instance an object of 8 Mbyte requires a read delay guarantee of 300 milliseconds at 99th percentile, using a block size of 1 Mbyte and (n,k)=(16,8) would satisfy the request. The preference is to use as large block size as possible and as minimum number of parity blocks as possible to reduce the overheads of using the storage cloud. These constructed FEC based CDF performance curves are typically stored in table form as shown in FIG. 10. Thus, when CPM 420 receives a request from request handler 400, CPM 420 can consult these tables for various object sizes to search if any FEC mode can be used to achieve the desired delay guarantee. For read operations, the search is limited to the modes that have been actually used to write the requested object.

If the delay performance is only requested for the single write operation, but not for the subsequent reads, then the parity blocks can be deleted from the key-value store once it is ensured that all the source blocks are written successfully. In another embodiment, if read performance is not needed, the source blocks can be combined together in the background after the first write operation and the object in its original form is written. Then, the source blocks can be deleted as well.

Note in one embodiment, rather than dividing a large object into smaller objects, the key-value store client groups multiple small objects into one object and then applies the rest of the storage process for the one object. For example, if multiple write requests are pending, then a parity block is created from it and it is written in parallel. In other words, if multiple objects are concatenated into one object, then the object can be split into K blocks and FEC can be applied. Then FEC blocks and source blocks are then written in parallel. As another example, if a user application request always requires multiple objects to be read, then the key-value store client groups them together and also creates parity blocks. In this example we do not create a one big object, but directly pad each object to the chunk size we want to use and then apply FEC across objects.

When the key-value store client has itself becomes a delay bottleneck, using the disclosed mechanisms would not be helpful, but can be harmful as they increase the processing and communication load. Thus, in a typical implementation, maximum number of threads should be tightly controlled and delay sensitive jobs should be given priority in task queue 440. If there is contention across delay sensitive requests, the system should back off from using FEC.

Figure 13:
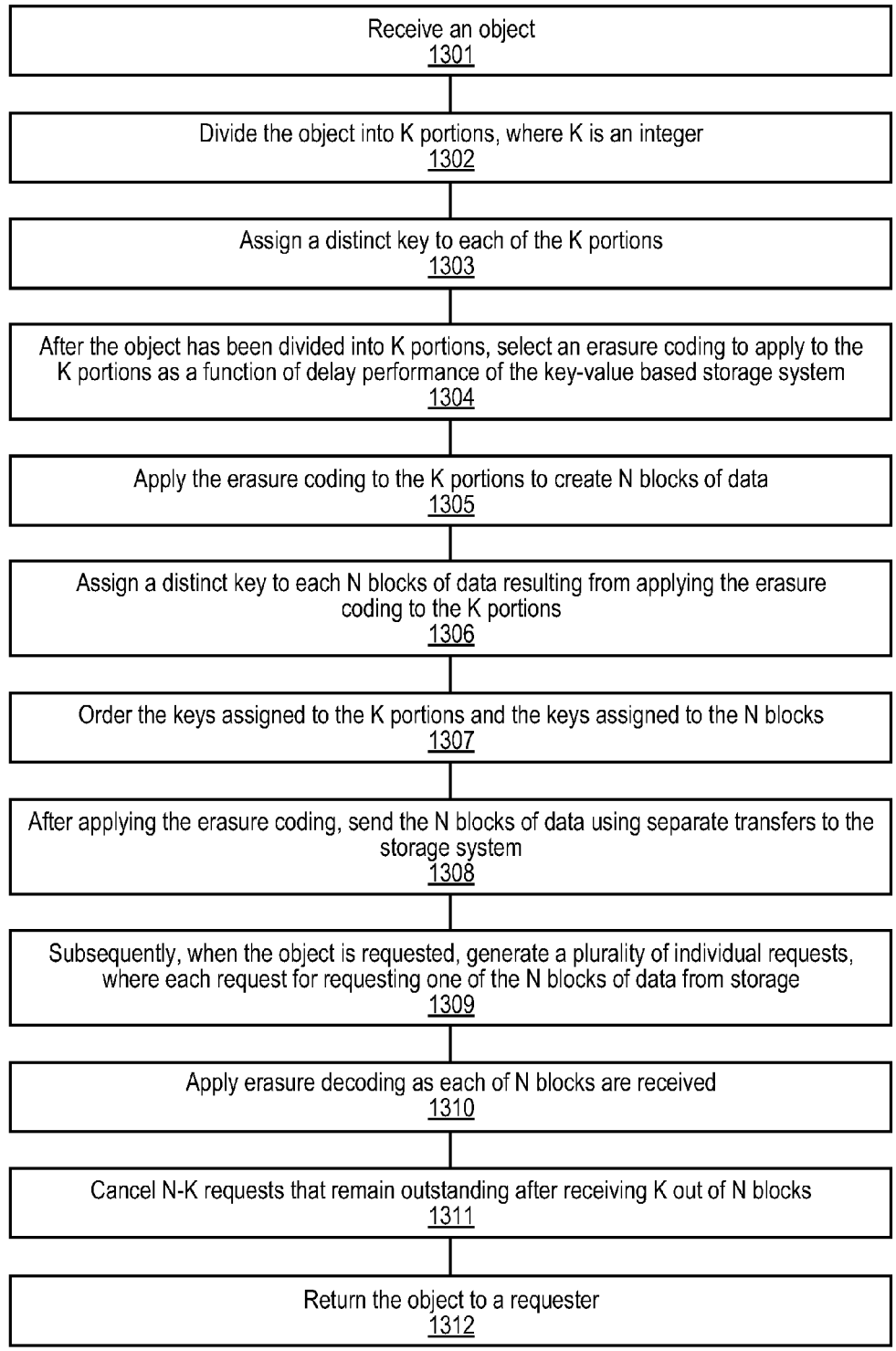
FIG. 13 is a flow diagram of one embodiment of a process performed by a storage controller.

FIG. 13 is a flow diagram of one embodiment of a process performed by a storage controller. The process is performed by processing logic that may comprise hardware (circuitry, dedicated logic, etc.), software (such as is run on a general purpose computer system or a dedicated machine), firmware, or a combination of two or more of them. In one embodiment, the process is performed by a key-value store client. In another embodiment, the process is performed by a storage gateway.

Referring to FIG. 13, the process begins by processing logic receiving an object (processing block 1301). Processing logic divides the object into K portions, where K is an integer (processing block 1302) and assigns a distinct key to each of the K portions (processing block 1303).

After the object has been divided into K portions, processing logic selects an erasure coding to apply to the K portions as a function of delay performance of the key-value based storage system (processing block 1304). In one embodiment, the erasure coding comprises forward error correction (FEC) coding. In one embodiment, selecting the erasure coding to apply is based on a delay target. In another embodiment, selecting the erasure coding to apply is based on a cumulative distribution function of the delay performance. In yet another embodiment, selecting the erasure coding to apply is based on the delay performance associated with the operation to be performed. In still yet another embodiment, selecting the erasure coding to apply is based on the object's size.

Next, processing logic applies the erasure coding to the K portions to create N blocks of data (processing block 1305). Processing logic assigns a distinct key to each of N blocks of data resulting from applying the erasure coding to the K portions (processing block 1306) and orders the keys assigned to the K portions and the keys assigned to the N blocks (processing block 1307).

After applying the erasure coding, processing logic sends the N blocks of data using separate transfers to the storage system (processing block 1308). In one embodiment, sending the N blocks of data over distinct connections to the storage system comprises sending at least two of the N blocks in parallel over two of the distinct connections.

In one embodiment, sending the N blocks of data using N separate transfers to the storage system comprises sending all N blocks in parallel on separate connections to the key-value store, including cancelling any of the N separate transfers that haven't been completed successfully after K of the N separate transfers have completed successfully.

Subsequently, when the object is requested, processing logic generates a plurality of individual requests, where each request for requesting one of the N blocks of data from storage (processing block 1309), applies erasure decoding as each of N blocks are received (processing block 1310), cancels N−K requests that remain outstanding after receiving K out of N blocks (processing block 1311), and returns the object to a requester (processing block 1312).

Figure 16:
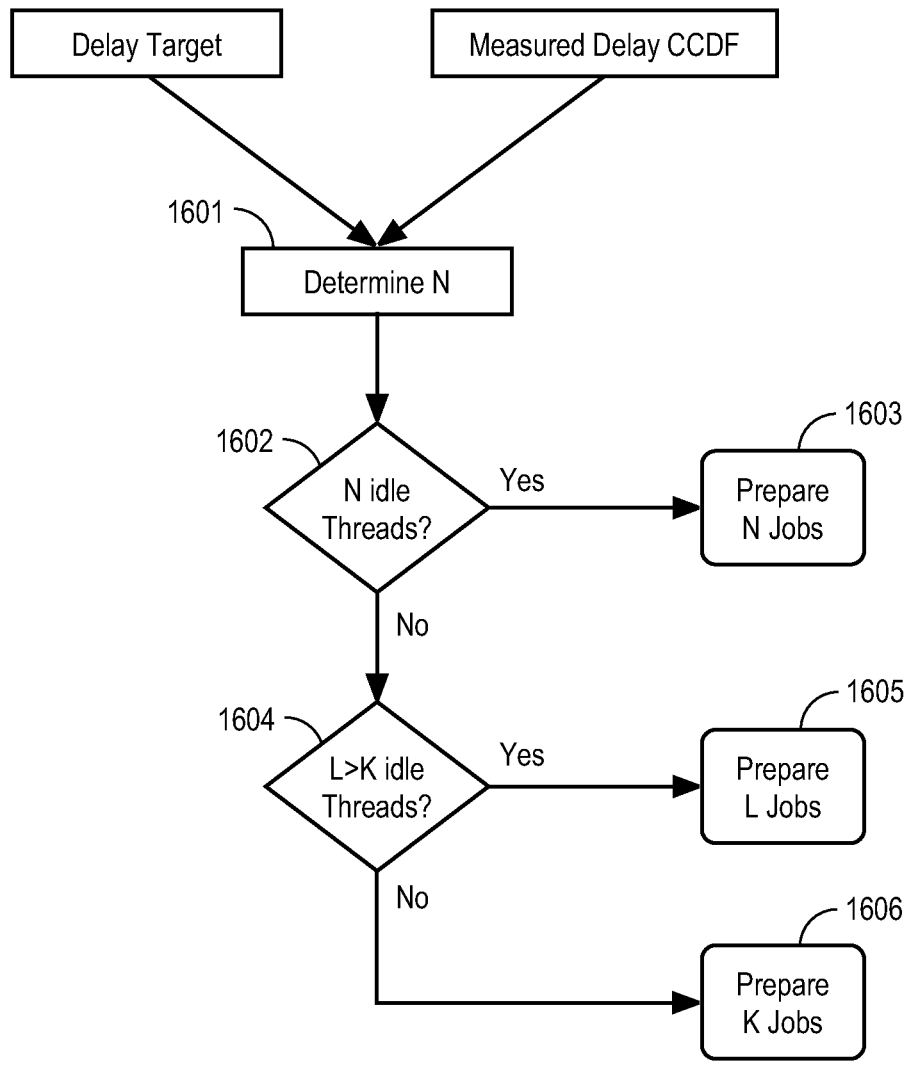
FIG. 16 is a flow diagram of an alternative embodiment of a process performed by a storage controller.

In an alternative embodiment, where less than N idle connections (L<N idle connections) are available for N such parallel requests, and instead of generating N parallel requests, the number of requests is selected as max(K,min(L,N)), where K is the number of source blocks, L is the number of idle threads at the time of picking the number of requests, and N is the ideal number of requests if only the delay was a constraint. FIG. 16 is a flow diagram of an alternative embodiment of a process performed by a storage controller. The process is performed by processing logic that may comprise hardware (circuitry, dedicated logic, etc.), software (such as is run on a general purpose computer system or a dedicated machine), firmware or a combination of two or more of them.

Referring to FIG. 16, the process begins with processing logic determining N based on a delay target and measured delay CCDF (processing block 1601). Next, processing logic determines if N idle threads are available (processing block 1602). If N idle threads are available, processing logic prepare N requests (processing block 1603). If not, the process transitions to processing block 1604 where processing logic determines if there are L idle threads where L is less than N but greater than K. If there are L idle threads, then processing logic prepares L requests (processing block 1605); otherwise, processing logic prepares K requests (processing block 1606).

Figure 14:
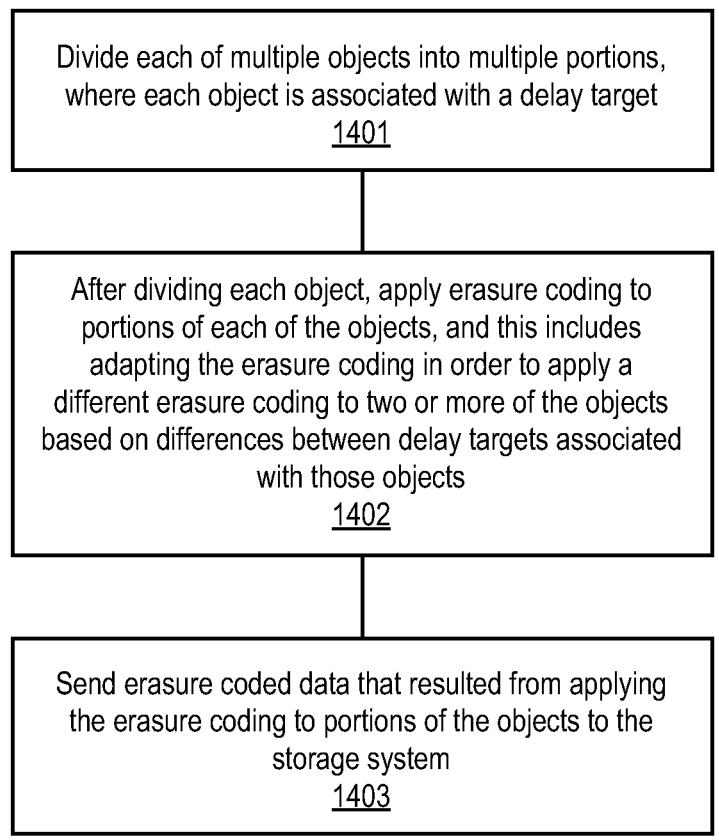
FIG. 14 is a flow diagram of another embodiment of a process performed by a storage controller.

FIG. 14 is a flow diagram of another embodiment of a process performed by a storage controller. The process is performed by processing logic that may comprise hardware (circuitry, dedicated logic, etc.), software (such as is run on a general purpose computer system or a dedicated machine), firmware or a combination of two or more of them.

Referring to FIG. 14, the process begins with processing logic dividing each of multiple objects into multiple portions, where each object is associated with a delay target (processing block 1401).

After dividing each object, processing logic applies erasure coding to portions of each of the objects, and this includes adapting the erasure coding in order to apply a different erasure coding to two or more of the objects based on differences between delay targets associated with those objects (processing block 1402).

Thereafter, processing logic sends erasure coded data that resulted from applying the erasure coding to portions of the objects to the storage system (processing block 1403).

An Example of a System

Figure 15:
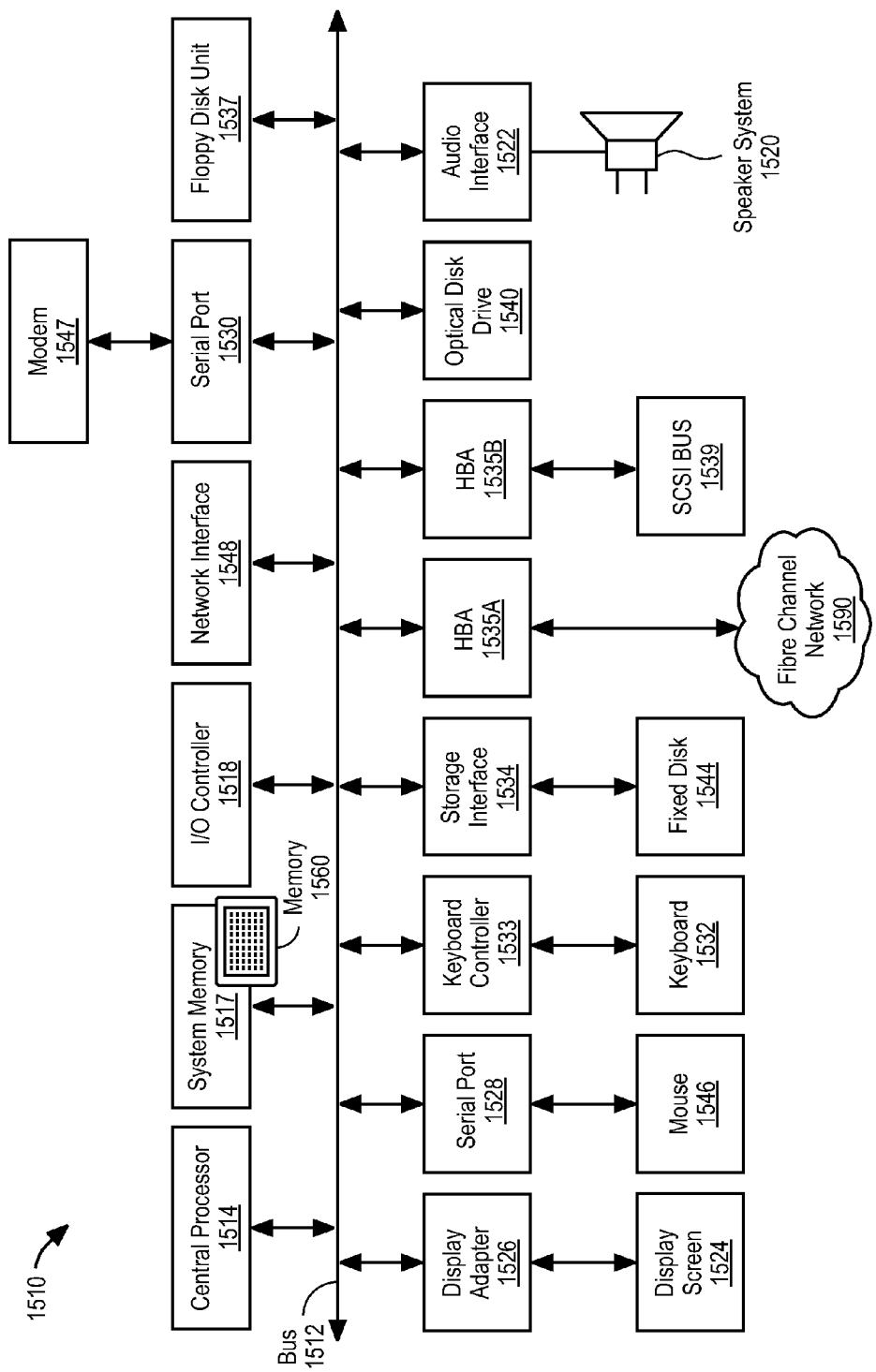
FIG. 15 is a block diagram of one embodiment of a storage gateway or client device.

FIG. 15 depicts a block diagram of a storage gateway that may be used to access a backend storage system, such as a cloud-based storage system. Such access to the backend storage system may be over a network (e.g., wide-area network, local area network, internet, etc.). As a storage gateway, the system can interface clients running user applications to backend storage systems. Such client may be coupled directly to the storage gateway or may communicate with the storage gateway over a network (e.g., wide-area network, local area network, internet, etc.). Note that the system depicted in FIG. 15 may also be a client device that performed the operations described above or interacts with a storage gateway to read or write data objects.

In one embodiment, the storage gateway of FIG. 15 executes and performs the operations associated with the application of show in FIG. 4.

Referring to FIG. 15, storage gateway 1510 includes a bus 1512 to interconnect subsystems of storage gateway 1510, such as a processor 1514, a system memory 1517 (e.g., RAM, ROM, etc.), an input/output controller 1518, an external device, such as a display screen 1524 via display adapter 1526, serial ports 1528 and 1530, a keyboard 1532 (interfaced with a keyboard controller 1533), a storage interface 1534, a floppy disk drive 1537 operative to receive a floppy disk 1538, a host bus adapter (HBA) interface card 1535A operative to connect with a Fibre Channel network 1590, a host bus adapter (HBA) interface card 1535B operative to connect to a SCSI bus 1539, and an optical disk drive 1540. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows data communication between central processor 1514 and system memory 1517. System memory 1517 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 1510 are generally stored on and accessed via a computer readable medium, such as a hard disk drive (e.g., fixed disk 1544), an optical drive (e.g., optical drive 1540), a floppy disk unit 1537, or other storage medium.

Storage interface 1534, as with the other storage interfaces of computer system 1510, can connect to a standard computer readable medium for storage and/or retrieval of information, such as a fixed disk drive 1544. Fixed disk drive 1544 may be a part of computer system 1510 or may be separate and accessed through other interface systems.

Modem 1547 may provide a direct connection to a backend storage system or a client via a telephone link or to the Internet via an internet service provider (ISP). Network interface 1548 may provide a direct connection to a backend storage system and/or a client. Network interface 1548 may provide a direct connection to a backend storage system and/or a client via a direct network link to the Internet via a POP (point of presence). Network interface 1548 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 15 need not be present to practice the techniques described herein. The devices and subsystems can be interconnected in different ways from that shown in FIG. 15. The operation of a computer system such as that shown in FIG. 15 is readily known in the art and is not discussed in detail in this application.

Code to implement the storage gateway operations described herein can be stored in computer-readable storage media such as one or more of system memory 1517, fixed disk 1544, optical disk 1542, or floppy disk 1538. The operating system provided on computer system 1510 may be MS-DOS®, MS-WINDOWS®, OS/2®, UNIX®, Linux®, or another known operating system.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method for use in a key-value based storage system, the method comprising:
    dividing an object into K portions, where K is an integer;
    selecting an erasure coding to apply to the K portions as a function of delay performance of the key-value based storage system including determining a number of parity blocks to generate to satisfy one or both of a delay target of putting the object into the key-value store and a delay target of subsequent read requests, where both delay targets are based on an offline performance simulation of delay performance when different numbers of parity blocks are used given the delay distributions obtained through measurements for different request types and object sizes;
    applying the erasure coding to the K portions to create N blocks of data; and
    sending the N blocks of data using separate transfers to the storage system.

2. The method defined in claim 1 further comprising:
    measuring the delay performance of putting objects to and getting objects from the storage system; and
    creating the offline performance simulation based on results of measuring the delay performance.

3. The method defined in claim 1 wherein selecting the erasure coding to apply is based on a cumulative distribution function of the delay performance.

4. The method defined in claim 1 wherein selecting the erasure coding to apply is based on the delay performance associated with the operation to be performed.

5. The method defined in claim 1 wherein selecting the erasure coding to apply is based on the object's size.

6. The method defined in claim 1 wherein the erasure coding comprises forward error correction (FEC) coding.

7. The method defined in claim 1 wherein sending the N blocks of data over distinct connections to the storage system comprises sending at least two of the N blocks in parallel over two of the distinct connections.

8. The method defined in claim 1 further comprising:
    assigning a distinct key to each of the K portions;
    assigning a distinct key to each of N blocks of data resulting from applying the erasure coding to the K portions;
    ordering the keys assigned to the K portions and the keys assigned to the N blocks; and
    wherein sending the N blocks of data using N separate transfers to the storage system comprises sending all N blocks in parallel on separate connections to the key-value store, including cancelling any of the N separate transfers that haven't been completed successfully after K of the N separate transfers have completed successfully.

9. The method defined in claim 1 further comprising:
    generating a plurality of individual requests, each request for requesting one of the N blocks of data from storage;
    applying erasure decoding as each of N blocks are received;
    cancelling N−K requests that remain outstanding after receiving K out of N blocks; and
    returning the object to a requester.

10. The method defined in claim 1 wherein N is the number of available threads.

11. The method defined in claim 1 wherein the separate transfers comprise a combination of parallel and serial transfers.

12. The method defined in claim 1 further comprising cancelling any of the N separate transfers that haven't been completed successfully after K of the N separate transfers have completed successfully.

13. An apparatus for use in a key-value based storage system, the apparatus comprising:
    a communication interface for coupling to a network, the communication interface operable to receive an object from the network;
    a memory coupled to the communication interface to store the object; and
    a processor coupled to the memory and the communication interface, the processor operable to
        divide the object into K portions, where K is an integer,
        select an erasure coding to apply to the K portions as a function of delay performance of the key-value based storage system, by, at least in part, determining a number of parity blocks to generate to satisfy one or both of a delay target of putting the object into the key-value store and a delay target of subsequent read requests, where both delay targets are based on an offline performance simulation of delay performance when different numbers of parity blocks are used given the delay distributions obtained through measurements for different request types and object sizes; and
        apply the erasure coding to the K portions to create N blocks of data; and wherein the processor operates with the communication interface to send the N blocks of data using separate transfers to the storage system.

14. The apparatus defined in claim 13 wherein the processor further operable to:
    measure the delay performance of putting objects to and getting objects from the storage system; and
    create the offline performance simulation based on results of measuring the delay performance.

15. The apparatus defined in claim 13 wherein the processor selects the erasure coding to apply based on a cumulative distribution function of the delay performance.

16. The apparatus defined in claim 13 wherein the processor selects the erasure coding to apply based on the delay performance associated with the operation to be performed.

17. The apparatus defined in claim 13 wherein the processor selects the erasure coding to apply based on the object's size.

18. The apparatus defined in claim 13 wherein the erasure coding comprises forward error correction (FEC) coding.

19. The apparatus defined in claim 13 wherein the communication interface sends the at least two of the N blocks in parallel over two of the distinct connections.

20. The apparatus defined in claim 13 wherein the processor is further operable to:
    assign a distinct key to each of the K portions;

assign a distinct key to each of N blocks of data resulting from applying the erasure coding to the K portions;

order the keys assigned to the K portions and the keys assigned to the N blocks; and wherein the communication interface sends the N blocks of data using N separate transfers in parallel on separate connections to the key-value store, and cancels any of the N separate transfers that haven't been completed successfully after K of the N separate transfers have completed successfully.

21. The apparatus defined in claim 13 wherein the processor is further operable to:

generate a plurality of individual requests, each request for requesting one of the N blocks of data from storage;

apply erasure decoding as each of N blocks are received;

cancel N−K requests that remain outstanding after receiving K out of N blocks; and return the object to a requester.

22. An article of manufacture having one or more non-transitory computer readable storage media storing instructions which, when executed by a system, causes the system to perform a method comprising:

dividing an object into K portions, where K is an integer;

selecting an erasure coding to apply to the K portions as a function of delay performance of a key-value based storage system, including determining a number of parity blocks to generate to satisfy one or both of a delay target of putting the object into the key-value store and a delay target of subsequent read requests, where both delay targets are based on an offline performance simulation of delay performance when different numbers of parity blocks are used given the delay distributions obtained through measurements for different request types and object sizes;

applying the erasure coding to the K portions to create N blocks of data; and sending the N blocks of data using separate transfers to the storage system.

23. The article of manufacture defined in claim 22 further comprising:

measuring the delay performance of putting objects to and getting objects from the storage system; and creating the offline performance simulation based on results of measuring the delay performance.

24. The article of manufacture defined in claim 22 wherein selecting the erasure coding to apply is based on a cumulative distribution function of the delay performance.

* * * * *